US012166752B2

United States Patent
Choi et al.

(10) Patent No.: US 12,166,752 B2
(45) Date of Patent: Dec. 10, 2024

(54) USER TERMINAL AND CONTROL METHOD OF ACCOUNT MANAGEMENT SERVER FOR MANAGING USER ACCOUNT

(71) Applicant: SAMSUNG ELECTRONICS CO., LTD., Suwon-si (KR)

(72) Inventors: Sungwook Choi, Suwon-si (KR); Amber Maheshwari, Uttar (IN); Gajender Singh, Uttar (IN); Varun Gupta, Uttar (IN); Horang Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 252 days.

(21) Appl. No.: 17/837,283

(22) Filed: Jun. 10, 2022

(65) Prior Publication Data

US 2022/0311761 A1    Sep. 29, 2022

Related U.S. Application Data

(63) Continuation of application No. PCT/KR2020/010223, filed on Aug. 3, 2020.

(30) Foreign Application Priority Data

Dec. 10, 2019    (KR) ........................ 10-2019-0163599

(51) Int. Cl.
*H04L 9/40*    (2022.01)
*G06F 21/31*    (2013.01)
(Continued)

(52) U.S. Cl.
CPC ...... *H04L 63/0838* (2013.01); *H04L 63/0876* (2013.01); *H04L 63/20* (2013.01); *H04L 67/141* (2013.01)

(58) Field of Classification Search
CPC . H04L 63/0838; H04L 63/0876; H04L 63/20; H04L 63/029; H04L 63/0884;
(Continued)

(56) References Cited

U.S. PATENT DOCUMENTS 8,281,380 B2    10/2012  Ogawa
8,539,562 B2     9/2013  Bolik et al.
(Continued)

FOREIGN PATENT DOCUMENTS

EP         3276878 A1    1/2018
JP       2003-186839 A   7/2003
(Continued)

OTHER PUBLICATIONS

International Search Report for International Application No. PCT/KR2020/010223 dated Nov. 3, 2020.
(Continued)

*Primary Examiner* — Vu V Tran
(74) *Attorney, Agent, or Firm* — STAAS & HALSEY LLP

(57) ABSTRACT

A user terminal comprising a communication interface and a processor, transmits a user authentication request to an account management server so as to perform authentication in association with a user account; when a request to access an external server is received, transmits the request to access the external server to the account management server when first one-time password (OTP) information and second OTP information are received from the account management server, establishes a first communication channel with a relay server by using the first OTP information; establishes a second communication channel between the relay server and the external server by using the second OTP informa-
(Continued)

tion; and communicates with the external server via the first communication channel and the second communication channel.

14 Claims, 7 Drawing Sheets

(51) Int. Cl.
    *G06F 21/46*     (2013.01)
    *H04L 9/32*     (2006.01)
    *H04L 67/141*     (2022.01)

(58) Field of Classification Search
    CPC ......... H04L 63/18; H04L 67/141; H04L 9/32; H04L 9/3213; G06F 21/31; G06F 21/46
    See application file for complete search history.

(56) References Cited

U.S. PATENT DOCUMENTS

| | | | |
|---|---|---|---|
| 10,091,004 B2 | 10/2018 | Ryu et al. | |
| 10,560,266 B2 | 2/2020 | Yim et al. | |
| 2009/0113537 A1 | 4/2009 | Woo | |
| 2015/0132984 A1* | 5/2015 | Kim | H04L 63/0838 439/345 |
| 2017/0141924 A1 | 5/2017 | Ryu et al. | |
| 2019/0372967 A1* | 12/2019 | Cho | H04L 9/3228 |
| 2021/0168148 A1* | 6/2021 | Boodaei | H04L 63/0861 |

FOREIGN PATENT DOCUMENTS

| | | |
|---|---|---|
| JP | 2007-293538 A | 11/2007 |
| JP | 2008-177824 A | 7/2008 |
| JP | 2009-110522 | 5/2009 |
| JP | 2010-506312 A | 2/2010 |
| JP | 2010-211294 A | 9/2010 |
| JP | 2012-14434 A | 1/2012 |
| JP | 5380063 B2 | 1/2014 |
| JP | 2015-121947 A | 7/2015 |
| JP | 2017-69755 A | 4/2017 |
| KR | 10-2005-0071768 A | 7/2005 |
| KR | 10-2007-0109442 A | 11/2007 |
| KR | 10-2015-0060048 A | 6/2015 |
| KR | 10-2017-0057549 | 5/2017 |
| KR | 10-2018-0065359 A | 6/2018 |
| KR | 10-2018-0100995 A | 9/2018 |
| WO | WO 2008/043090 A1 | 4/2008 |

OTHER PUBLICATIONS

International Written Opinion for International Application No. PCT/KR2020/010223 dated Nov. 3, 2020.
Consolidated account management organization and user link (or association) + user consolidated management, http://securus.kr/?page_id=222#tab-id-1 (Retrieved on Sep. 9, 2019).
User authentication based on multi-factor authentication, http://www.secuve.com/html/sub02/sub02_020203.php (Retrieved on Sep. 9, 2019).
Notice of Allowance dated May 30, 2024 issued Korean Patent Application No. 10-2019-0163599.

* cited by examiner

USER TERMINAL AND CONTROL METHOD OF ACCOUNT MANAGEMENT SERVER FOR MANAGING USER ACCOUNT

CROSS-REFERENCE TO RELATED APPLICATION(S)

This application is a continuation application, under 35 U.S.C. § 111(a), of International Patent Application No. PCT/KR2020/010223, filed on Aug. 3, 2020, which claims the benefit of Korean Patent Application No. 10-2019-0163599, filed on Dec. 10, 2019, in the Korean Intellectual Property Office, the entire disclosures of which are herein incorporated by reference as a part of this application.

BACKGROUND

Field

This disclosure relates to a user terminal and a method for controlling an account management server for managing a user account and, more specifically, to a user terminal performing communication with an external server through a relay server and a method for controlling an account management server for managing a user account by controlling the relay server.

Description of Related Art

When a user wishes to access an external server using own account, there are various authentication schemes. As an example, there is a scheme in which a user inputs identification (ID) and a password for accessing an external server through a user terminal to authenticate. However, in this case, it is troublesome that the user needs to know the ID and password for accessing the external server to perform authentication and the user should periodically change the password for security.

According to another embodiment, there is a scheme that the user receives an ID and a password from an authentication server through authentication with respect to an authentication server, and inputs the received ID and password through a user terminal when accessing an external server. In this example, the password transmitted to the user needs to be stored in a form of a plaintext or a form that may be decrypted in the authentication server, and when the authentication server is exposed to an external attacker, or the like, there is as problem that password information of all users stored in the database of the authentication server may be leaked.

Therefore, there is a need of technology for account management equipped with user convenience and safety against password information leakage.

SUMMARY

According to an embodiment, provided is a control method, and control method of a user terminal includes performing authentication in association with a user account by transmitting a user authentication request to an account management server; based on receiving a request to access an external server after the performing of the authentication in association with the user account, transmitting a request to access the external server to the account management server; based on receiving first one time password (OTP) information and second OTP information from the account management server in response to the request to access the external server, establishing a first communication channel with a relay server to access the external server using the first OTP information; establishing a second communication channel between the relay server and the external server using the second OTP information through the first communication channel; and communicating with the external server through the first communication channel and the second communication channel.

According to another embodiment, a control method of an account management server may include, based on receiving a user authentication request from a user terminal, performing authentication in association with the user terminal; and based on receiving an access request to access an external server from the authenticated user terminal, generating a first one time password (OTP) and transmitting the first OTP to the authenticated user terminal and a relay server to access the external server, and generating a second OTP to transmit the second OTP to the authenticated user terminal and the external server.

A user terminal according to a still another embodiment includes a communication interface; and a processor, and the processor may perform authentication in association with a user account by transmitting a user authentication request to an account management server, based on receiving a request to access an external server after the performing of the authentication in association with the user account, transmit a request to access the external server to the account management server, based on receiving first one time password (OTP) information and second OTP information from the account management server in response to the request, establish a first communication channel with a relay server to access the external server using the first OTP information, establish a second communication channel between the relay server and the external server using the second OTP information through the first communication channel, and communicate with the external server through the first communication channel and the second communication channel.

An account management server according to another embodiment includes a communication interface; and a processor, and the processor may, based on receiving a user authentication request from a user terminal, perform authentication in association with the user terminal, and based on receiving an access request to access an external server from the authenticated user terminal, generate a first one time password (OTP) and transmit the first OTP to the authenticated user terminal and a relay server to access the external server.

The means for solving the task of the disclosure are not limited to the above-described solving means, and it will be apparent to those skilled in the art to which the disclosure belongs from the specification and the appended drawings.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
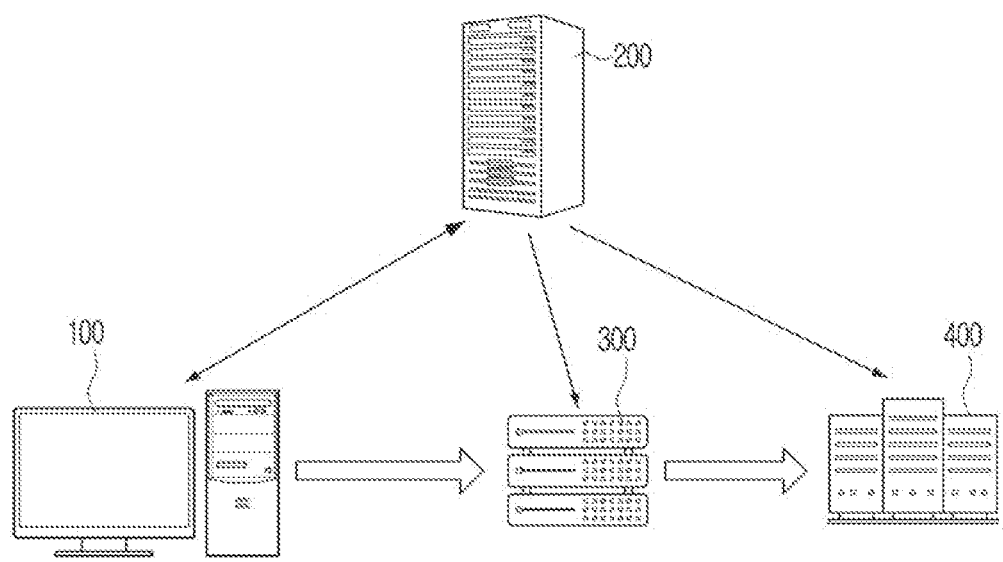
FIG. 1 is a diagram illustrating an account management system according to an embodiment of the disclosure.

After terms used in the present specification are briefly described, the disclosure will be described in detail.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

One or more specific embodiments of the disclosure are illustrated in the drawings and are described in detail in the detailed description. However, it is to be understood that the disclosure is not limited to the one or more specific embodiments, but includes all modifications, equivalents, and substitutions without departing from the scope and spirit of the disclosure. Also, well-known functions or constructions are not described in detail since they would obscure the disclosure with unnecessary detail.

As used herein, the terms "first," "second," or the like may identify corresponding components, regardless of importance of order, and are used to distinguish a component from another without limiting the components.

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Embodiments of the disclosure will be described in detail with reference to the accompanying drawings to aid in the understanding of those of ordinary skill in the art. However, the disclosure may be realized in various different forms and it should be noted that the disclosure is not limited to the various embodiments described herein. Further, in the drawings, parts not relevant to the description may be omitted, and like reference numerals may be used to indicate like elements.

The disclosure provides an account management technology having user convenience and safety from and password information leakage.

The technical spirit of the disclosure is not limited to the above-mentioned technical challenges, and other technical challenges that are not mentioned will be clearly understood by those skilled in the art in the art from the following description.

According to various embodiments of the disclosure as described herein, the account management server may improve the safety against the password information leakage by transmitting the one-way encrypted password to the relay server and the external server.

In addition, the effects that can be obtained or predicted by the embodiments of the disclosure will be disclosed directly or implicitly in a detailed description of the embodiment of the disclosure. For example, the various effects predicted according to the embodiment of the disclosure will be disclosed in a detailed description to be described.

FIG. 1 is a diagram illustrating an account management system according to an embodiment of the disclosure.

A user terminal 100 may transmit a user authentication request to an account management server 200 to perform authentication on a user account. In this example, the user terminal 100 may perform authentication on the user account in various ways. For example, the account management server 200 may require credential information (e.g., password) from the user terminal 100. The user terminal 100 may transmit the credential information input by the user to the account management server 200. The account management server 200 may determine whether the user terminal 100 is a pre-registered terminal based on the credential information received from the user terminal 100. As another example, based on the account management server 200 being associated with an authentication server for which authentication has been completed by the user terminal 100, the user terminal 100 may access the account management server 200 without performing separate authentication on the account management server 200. The user terminal 100 may perform authentication on the user account through a single sign-on (SSO) authentication scheme. The user terminal 100 may access the account management server 200 without additional user credential information input for authentication of the account management server 200, thereby improving user convenience.

When the user terminal 100 receives a request for accessing the external server 400 from the user after the authentication on the user account is performed, the user terminal 100 may transmit a request to access the external server 400 to the account management server 200. Specifically, based on the authentication on the user account being successful, the account management server 200 may transmit an authentication token to the user terminal 100. The user terminal 100 may transmit a request to access the external server 400 to the account management server 200 using the received authentication token. The external server 400 may be a destination server remote from the user terminal 100.

The account management server 200 may generate a first one time password (OTP) in response to a user request and transmit the OTP to the relay server 300. The relay server 300 may receive the first OTP and store the first OTP in the database. The relay server 300 may be located in the same network environment as the external server 400 or may be located within a data center present within a predetermined range from the external server 400. There may be a plurality of relay servers 300 in a network environment to which one external server 400 belongs. The account management server 200 may allocate one relay server 300 closest to the external server 400 among the plurality of relay servers 300. The account management server 200 may generate the second OTP in response to the user request and transmit the second OTP to the external server 400. The external server 400 may receive the second OTP and store the second OTP in the database.

The account management server 200 may transmit the generated first OTP and the second OTP to the user terminal 100. The user terminal 100 may generate (establish) a communication channel toward the external server 400 based on the first OTP and the second OTP. Specifically, the user terminal 100 may generate a first communication channel from the relay server 300 using the first OTP. The user terminal 100 may perform authentication with the relay server 300 based on the first OTP obtained from the account management server 200. Based on the authentication being completed, the user terminal 100 may generate a first communication channel and communicate with the relay server 300.

The user terminal 100 may access the relay server 300 to generate a second communication channel between the relay server 300 and an external server 400 based on the second OTP. The user terminal 100 may perform authentication with the external server 400 using the second OTP. Based on the authentication being completed, the user terminal 100 may generate a second communication channel and communicate with the external server 400 through the second communication channel. For example, the user terminal 100 may transmit data to the relay server 300 through the first communication channel, and the relay server 300 may transmit the data received from the user terminal 100 to the external server 400 through the second communication channel.

As described above, the external server 400 may communicate with the user only through the relay server 300. Accordingly, even if a password for access to the external server 400 is obtained, the external attacker may not access the external server 400 based on the relay server 300 being not used. Accordingly, the safety of the external server 400 may be improved.

When the user terminal 100 generates the first communication channel, the account management server 200 may generate a third OTP different from the first OTP used in generating the first communication channel and transmit the third OTP to the relay server 300. The relay server 300 may delete the first OTP stored in the internal database and store the third OTP. Accordingly, even if the first OTP is exposed to the outside, the security for the relay server 300 may be maintained. The account management server 200 may randomly generate and update a password for authentication with the relay server 300 when the user terminal 100 generates the first communication channel. Since the user does not need to separately change the password for authentication with the relay server 300 for security, the ease of account management and user satisfaction may be improved.

When the user terminal 100 generates the second communication channel, the account management server 200 may generate a fourth OTP different from the second OTP used in generating the second communication channel and transmit the fourth OTP to the external server 400. The external server 400 may delete the second OTP stored in the internal database and store the fourth OTP. Accordingly, even if the second OTP is exposed to the outside, the security for the relay server 300 may be maintained. The account management server 200 may randomly generate and update a password for authentication with the external server 400 when the user terminal 100 generates the second communication channel. Since the user does not need to separately change the password for authentication with the external server 400 for security, the ease of account management and user satisfaction may be improved.

The first communication channel and the second communication channel may be generated according to various protocols. For example, the first communication channel and the second communication channel may be generated according to a secure shell (SSH) tunneling protocol. However, this is merely exemplary and the first communication channel and the second communication channel may be generated according to a remote desktop protocol (RDP).

Hereinafter, each configuration of the user terminal 100 will be described.

Figure 2:
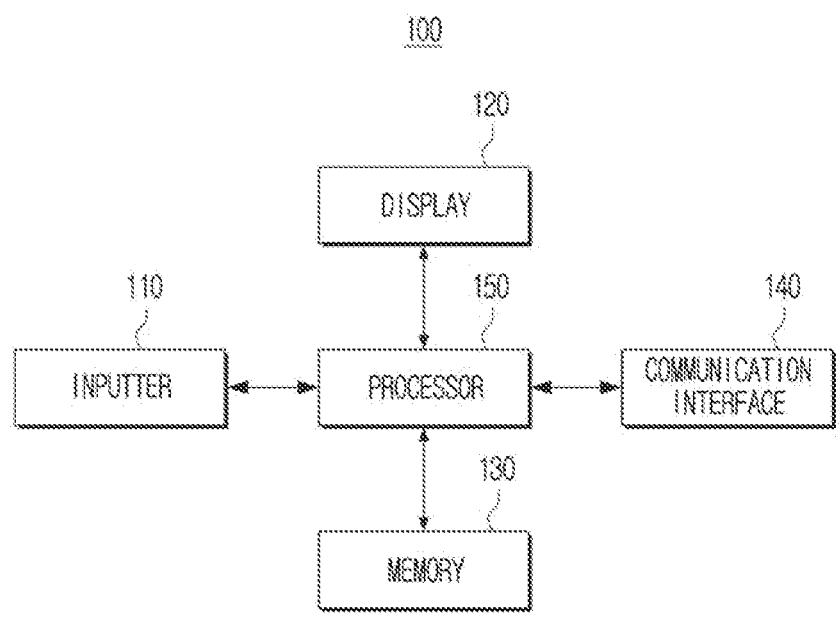
FIG. 2 is a block diagram illustrating a configuration of a user terminal according to an embodiment of the disclosure.

FIG. 2 is a block diagram illustrating a configuration of a user terminal according to an embodiment of the disclosure.

Referring to FIG. 2, the user terminal 100 may include an inputter 110, a display 120, a memory 130, a communication interface 140, and a processor 150. For example, the user terminal 100 may be implemented as an electronic device such as a personal computer (PC), a mobile device, or the like. The user terminal 100 may not necessarily include all of the components described above, but may be implemented without some components.

The inputter 110 may receive various user commands and information. For example, the inputter 110 may obtain a user command requesting access to the external server 400. In addition, the inputter 110 may obtain a user input for selecting an external server 400 from a plurality of external server lists displayed through the display 120. Alternatively, the inputter 110 may obtain a user command for authentication with the account management server 200. The inputter 110 may be implemented with various mechanical devices such as a keyboard, a mouse, a voice input device, and an electronic pen, or the like.

The display 120 may display various screens. For example, the display 120 may display an execution screen of an application or program related to the account management server 200. The display 120 may be implemented with various types of displays, such as a liquid crystal display (LCD), an organic light emitting diode (OLED) display, a plasma display panel (PDP), or the like.

The memory 130 may store various programs and data necessary for operation of the user terminal 100. At least one instruction may be stored in the memory 130. The processor 150 may perform the operation of the user terminal 100 by executing the instructions stored in the memory 130. The memory 130 may be implemented as a non-volatile memory, a volatile memory, or the like.

The communication interface 140 may include at least one circuit and may perform communication with various types of external devices in accordance with various types of communication schemes. The communication interface 140 may communicate with the account management server 200, the relay server 300, and the external server 400. Specifically, the communication interface 140 may receive an authentication token and an OTP from the account management server 200.

The communication interface 140 may communicate with the account management server 200 in a first communication method. The communication interface 140 may communicate with the relay server 300 in a second communication method. The communication interface 140 may communicate with the external server 400 in a third communication method. The first communication scheme and the second communication scheme may be the same. For example, the first communication scheme and the second communication scheme may be implemented via a wired communication module (e.g., a LAN, etc.). The second communication scheme may be different from the third communication scheme. For example, the second communication scheme may be implemented through a wired communication module, and the third communication scheme may be implemented through a wired and wireless communication module. Specifically, the communication interface 140 may communicate with the relay server 300 through the first communication channel in a wired communication manner. The communication interface 140 may communicate with the external server 400 through the second communication channel in a wireless communication method. The first communication channel may be implemented through a wired communication method, and the second communication channel may be implemented through a wireless communication method. Based on communicating with the external server 400 in a wireless communication method, the communication interface 140 may include at least one of a Wi-Fi communication module, a cellular communication module, a 3rd generation (3G) mobile communication module, a fourth generation (4G) mobile communication module, a 4G long term evolution (LTE) communication module, or a fifth generation (5G) mobile communication module.

The processor 150 may control overall operations of the user terminal 100.

As an example, the processor 150 may transmit a user authentication request to the account management server 200 to perform authentication on the user account. The processor 150 may obtain user input including authentication information (e.g., ID and password) through the inputter 110, and transmit the obtained user input to the account management server 200 through the communication interface 140. The processor 150 may perform authentication on the user account through the SSO authentication scheme. The processor 150 may obtain an authentication token by performing authentication on the SSO authentication server associated with the account management server 200 before performing authentication on the user account, and perform authentication on a user account using the obtained authentication token. The processor 150 may perform authentication on the basis of the authentication information of the user with respect to the SSO authentication server, and perform authentication on the user account through the SSO authentication server.

The processor 150 may receive a user request to access the external server 400 after authentication on the user account has been performed. The processor 150 may transmit a user request to the account management server 200 to access the external server 400. The processor 150 may obtain an authentication token from the account management server 200 according to user account authentication, and transmit a connection request for the external server 400 to the account management server 200 using the obtained authentication token. Meanwhile, the user request to access the external server 400 may be performed in various ways. For example, a user request may be performed in a way that a plurality of accessible external servers 400 are displayed and a user selects one of the displayed external servers.

The processor 150 may receive the first OTP and the second OTP from the account management server 200 in response to the user request. The processor 150 may generate a first communication channel with the relay server 300 to connect to the external server 400 using the first OTP. The processor 150 may also generate a second communication channel between the relay server 300 and the external server 400 using the second OTP. The processor 150 may access the relay server 300 through the first communication channel and then perform authentication with the external server 400 to generate a second communication channel. Meanwhile, the first OTP and the second OTP are different from each other, and may be respectively stored in the relay server 300 and the external server 400 in a one-way encrypted state. Here, the one-way encrypted state may mean a state in which decryption of the encrypted data is impossible. The first communication channel and the second communication channel may be generated according to the SSH tunneling protocol. The processor 150 may communicate with the external server 400 through the first communication channel and the second communication channel.

The account management server 200 will be described below.

Figure 3:
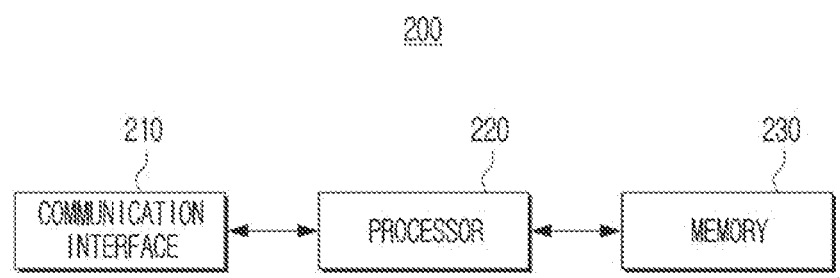
FIG. 3 is a block diagram illustrating a configuration of an account management server according to an embodiment of the disclosure.

FIG. 3 is a block diagram illustrating a configuration of an account management server according to an embodiment of the disclosure.

Referring to FIG. 3, the account management server 200 may include a communication interface 210, a processor 220, and a memory 230. For example, the account management server 200 may be an application programming interface (API) server. The account management server 200 does not necessarily include all of the elements described above, and may be implemented without some components. Since the memory 230 may correspond to the memory 130 of FIG. 2, a repeated description will be omitted.

The communication interface 210 may include at least one circuit and may communicate with various types of external devices in accordance with various types of communication schemes. The communication interface 210 may communicate with the user terminal 100, the relay server 300, and the external server 400. Specifically, the communication interface 210 may receive user authentication information from the user terminal 200.

The communication interface 210 may communicate with the user terminal 100 in a first communication method. The communication interface 210 may communicate with the relay server 300 in a second communication method. The communication interface 210 may communicate with the external server 400 in a third communication method. The first communication scheme and the second communication scheme may be the same. For example, the first communication scheme may be implemented via a wired communication module (e.g., a LAN, etc.). The first communication scheme may be different from the third communication scheme. For example, the first communication scheme may be implemented through a wired communication module, and the third communication scheme may be implemented through a wireless communication module. When communicating with the external server 400 in a wireless communication method, the communication interface 210 may include at least one of a Wi-Fi communication module, a cellular communication module, a 3G mobile communication module, a 4G mobile communication module, a 4G long term evolution (LTE) communication module, and a 5G mobile communication module.

Based on a user authentication request being received from the user terminal 100, the processor 220 may perform authentication on the user terminal 100. The processor 220 may determine whether the user terminal is a terminal pre-registered in the memory 230. Based on the user terminal 100 being determined to be a pre-registered terminal, the processor 220 may generate an authentication token and transmit the authentication token to the user terminal 100.

The processor 220 may identify the at least one relay server 300 upon receiving an access request for the external server 400 from the authenticated user terminal 100. For example, the processor 220 may identify the relay server 300 closest to the external server 400 among the plurality of relay servers existing in the network to which the external server 400 belongs. The processor 220 may identify the plurality of relay servers 300 for communication load reduction.

Upon receiving an access request for the external server 400 from the authenticated user terminal 100, the processor 220 may generate the first OTP and transmit the generated first OTP to the relay server 300 for connecting to the authenticated user terminal and the external server 400. The processor 220 may generate the second OTP and transmit the second OTP to the authenticated user terminal and the external server 400. The processor 220 may transmit the first OTP and the second OTP to the relay server 300 and the external server 400, respectively, in a hash state by one-way encryption. The first OTP and the second OTP transmitted to the relay server 300 and the external server 400 may be stored in the relay server 300 and the external server 400, respectively.

When a first communication channel between the user terminal 100 and the relay server 300 is generated based on the first OTP, the processor 220 may generate a third OTP different from the first OTP and transmit the third OTP to the relay server 300. Alternatively, the processor 220 may generate a third OTP different from the first OTP and transmit the third OTP to the relay server 300 if more than a predetermined time passes from the time based on the first communication channel being generated. The relay server 300 may delete the pre-stored first OTP while storing the third OTP.

When the second communication channel between the relay server 300 and the external server 400 is generated based on the second OTP, the processor 220 may generate a fourth OTP different from the second OTP and transmit the fourth OTP to the external server 400. Alternatively, the processor 220 may generate a fourth OTP different from the second OTP and transmit the fourth OTP to the external server 400 when a predetermined time or more has passed from the time when the second communication channel is generated. The external server 400 may delete the pre-stored second OTP while storing the fourth OTP. Accordingly, even if the pre-stored first OTP and the second OTP are exposed to the outside, the relay server 300 and the external server 400 may not be exposed to the outside.

Hereinafter, an operation of the account system including an account management server will be described according to various embodiments.

Figure 4:
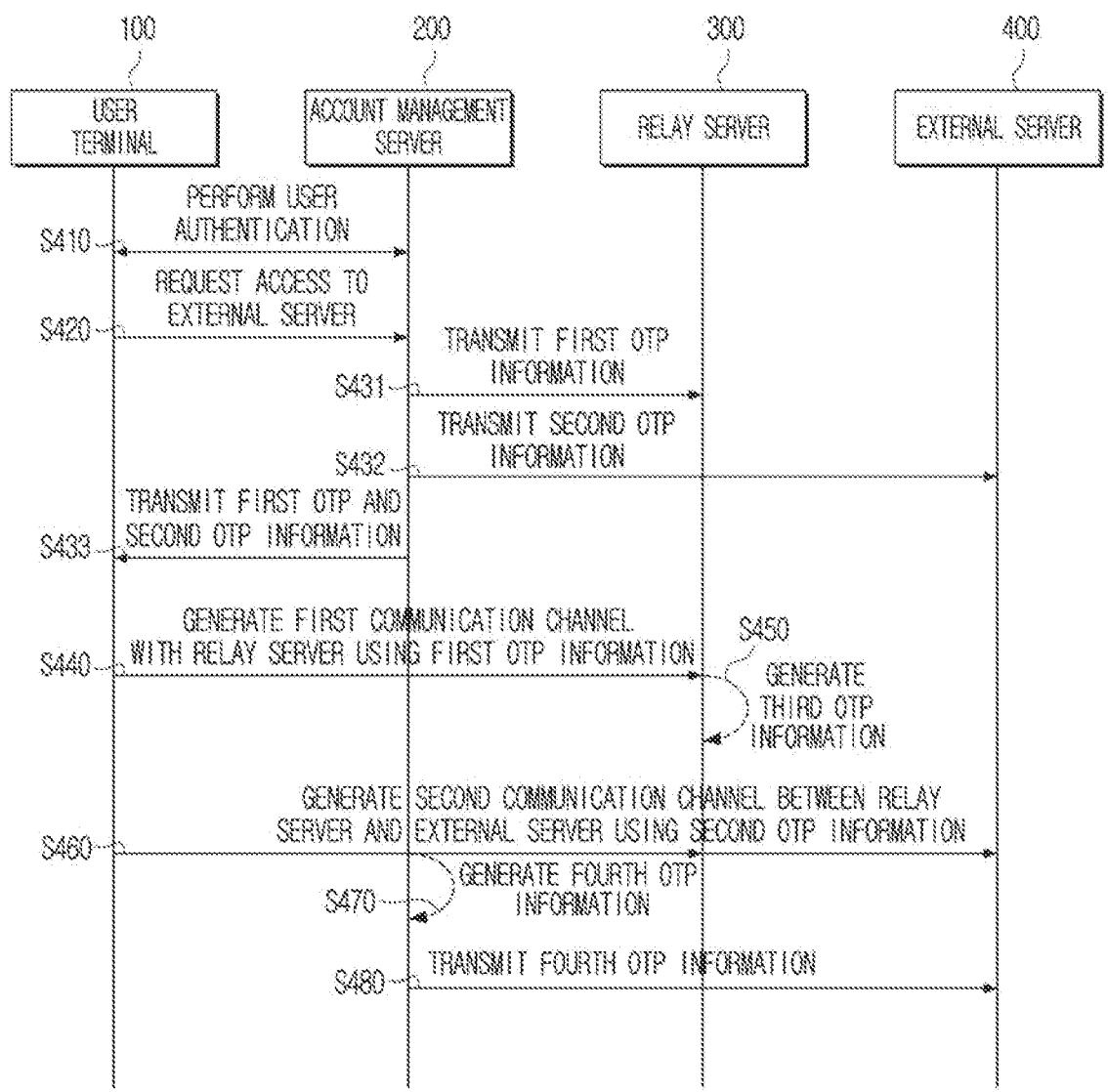
FIGS. 4 and 5 are a sequence diagram illustrating the operation of the account management system according to various embodiments of the disclosure.

FIG. 4 is a sequence diagram illustrating the operation of the account management system according to an embodiment of the disclosure.

The user terminal 100 may perform user authentication with the account management server 200 in operation S410. The user terminal 100 may perform authentication on the user account through the SSO authentication method. Alternatively, the account management server 200 may determine whether the user terminal 100 corresponds to a pre-registered terminal. If the user terminal 100 corresponds to a pre-registered terminal, the account management server 200 may transmit the authentication token to the user terminal 100.

The user terminal 100 may transmit a request to access the external server 400 with respect to the account management server 200 in operation S420. The user terminal 100 may transmit a request to access the account management server 200 to the external server 400 through the authentication token received from the account management server 200.

Based on the user request being received, the account management server 200 may identify the relay server 300 closest to the external server 400 among the at least one pre-installed relay server. The account management server 200 may generate the first OTP information (or OTP) and transmit the OTP information (or OTP) to the relay server 300 in operation S431. The first OTP information may be stored in the relay server 300 in a one-way encrypted state. The account management server 200 may generate the second OTP information and transmit the generated second OTP information to the external server 400 in operation S432. The second OTP information may be stored in the external server 400 in a one-way encrypted state. The account management server 200 may transmit the first OTP information and the second OTP information to the user terminal 100 in operation S433.

The user terminal 100 may generate the first communication channel with the relay server 300 using the first OTP information in operation S440. Based on the first communication channel being generated, the relay server 300 may generate the third OTP information and store the generated third OTP information in a one-way encrypted state in operation S450. The user terminal 100 may generate a second communication channel between the relay server 300 and the external server 400 using the second OTP information in operation S460. Based on the second communication channel being generated, the account management server 200 may generate the fourth OTP information in operation S470. The account management server 200 may transmit the generated fourth OTP information to the relay server 300 in operation S480. The transmitted fourth OTP information may be stored in the relay server 300 in a one-way encrypted state.

Figure 5:
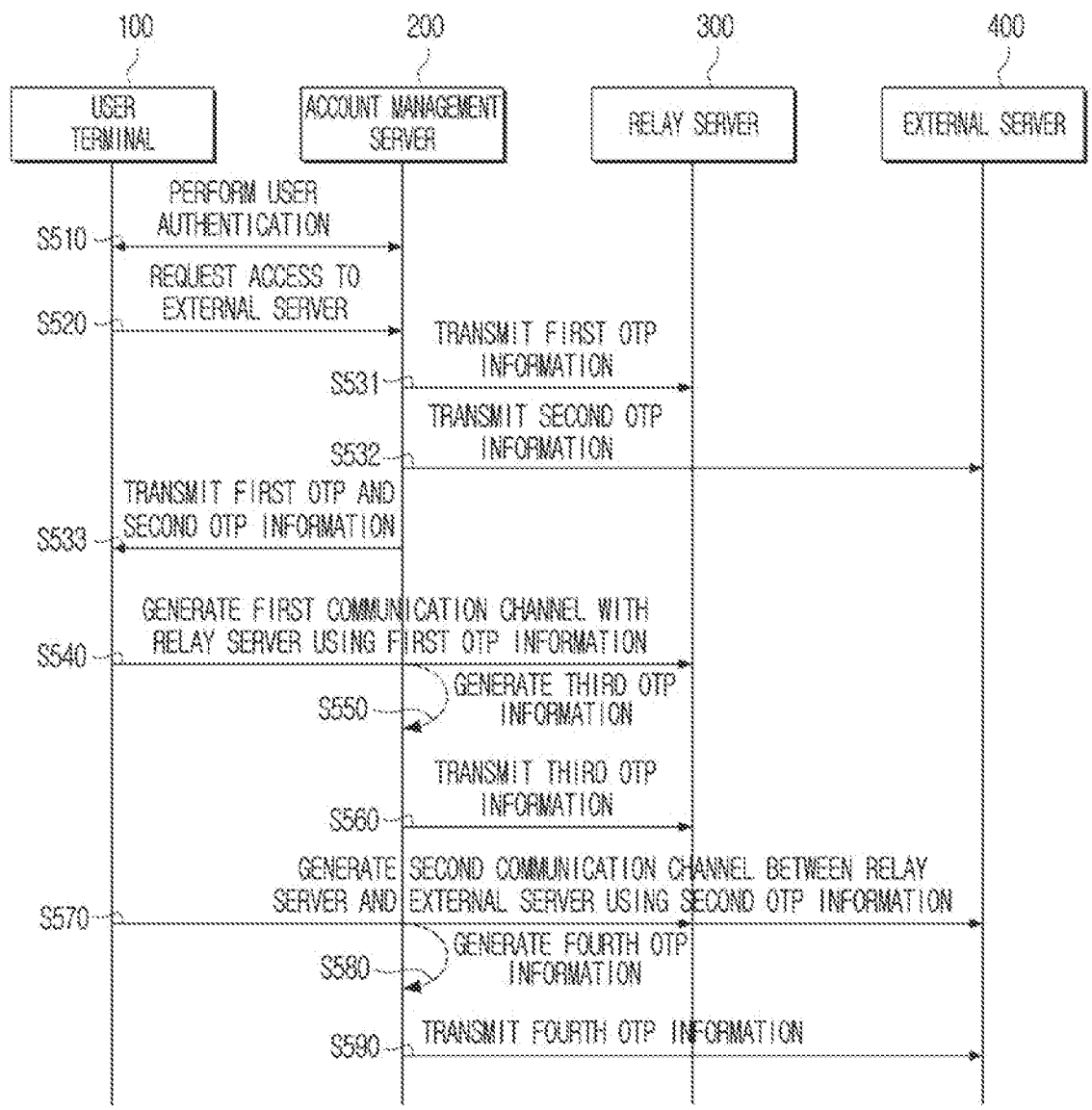

FIG. 5 is a sequence diagram illustrating the operation of the account management system according to another embodiment of the disclosure.

The operations S510, S520, S531, S532, S533, S540, S570, S580, and S590 overlap the operation of the account management system described above in FIG. 4, and a detailed description thereof will be omitted.

The user terminal 100 may generate the first communication channel with the relay server 300 using the first OTP information in operation S540. At this time, the relay server 300 may perform authentication on the user terminal 100 based on the pre-stored first OTP information. Based on the authentication being completed and the first communication channel is generated, the account management server 200 may generate third OTP information different from the first OTP in operation S550, and transmit the generated third OTP information to the relay server 300 in operation S560. The relay server 300 may update the pre-stored first OTP information to the third OTP information.

Although FIG. 4 and FIG. 5 show that the account management server 200 generates the fourth OTP information and transmits the generated fourth OTP information to the external server 400, the account management server 200 may not generate the fourth OTP information even if the second communication channel is generated. Based on the OTP stored in the external server 400 being not updated, the safety of the external server 400 may be maintained, because even if the OTP information stored in the external server 400 is exposed to the outside, communication with the external server 400 may be performed only through the second communication channel.

The operation of the account management system has been described above with respect to the operation of the account management system.

Hereinafter, a method for controlling a user terminal and an account management server will be described below.

Figure 6:
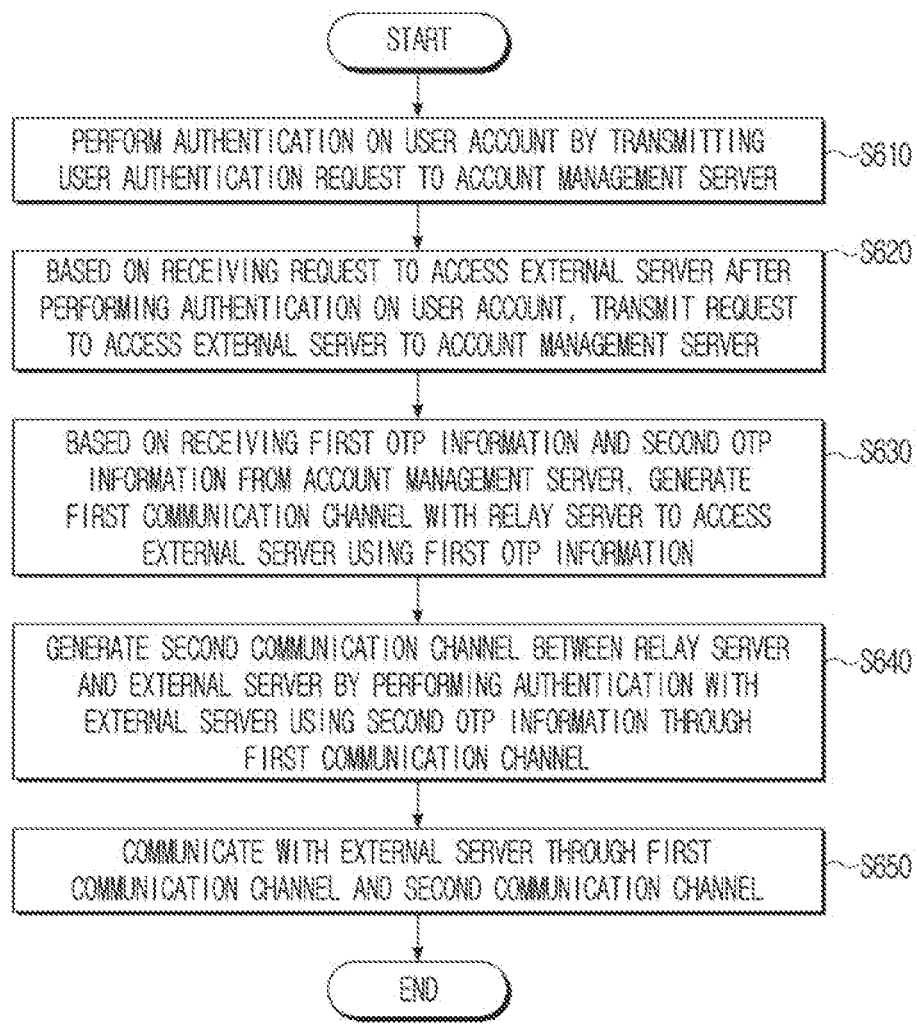
FIG. 6 is a flowchart illustrating a method of controlling a user terminal according to an embodiment of the disclosure.

FIG. 6 is a flowchart illustrating a method of controlling a user terminal according to an embodiment of the disclosure.

Referring to FIG. 6, a control method of a user terminal may include performing authentication on a user account by transmitting a user authentication request to an account management server in operation S610; based on receiving a request to access an external server after performing authentication on the user account, transmitting a request to access the external server to the account management server in operation S620; based on receiving first one time password (OTP) information and second OTP information from the account management server in response to the request, generating a first communication channel with a relay server to access the external server using the first OTP information in operation S630; generating a second communication channel between the relay server and the external server using the second OTP information through the first communication channel in operation S640; and communicating with the external server through the first communication channel and the second communication channel in operation S650. Each step of the control method of the user terminal according to the embodiment will be clearly understood with reference to FIG. 4, and a detailed description thereof will be omitted.

Figure 7:
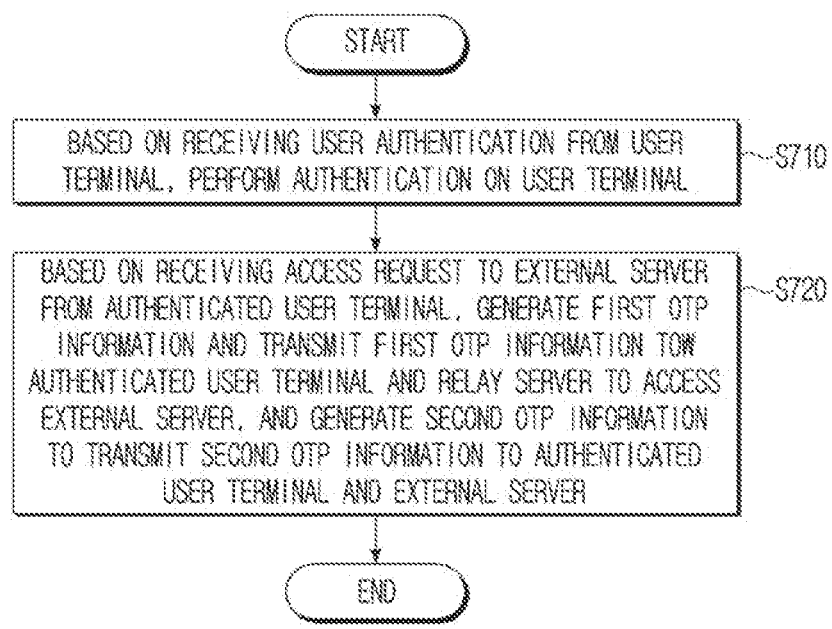
FIG. 7 is a flowchart illustrating a method of controlling an account management server according to an embodiment of the disclosure.

FIG. 7 is a flowchart illustrating a method of controlling an account management server according to an embodiment of the disclosure.

Referring to FIG. 7, a control method of an account management server may include, based on receiving a user authentication request from a user terminal, performing authentication on the user terminal in operation S710; and based on receiving an access request to an external server from the authenticated user terminal, generating a first one time password (OTP) information and transmitting the first OTP information to the authenticated user terminal and a relay server to access the external server, and generating second OTP information to transmit the second OTP information to the authenticated user terminal and the external server in operation S720. Each step of the control method of the user terminal according to the embodiment will be clearly understood with reference to FIG. 4, and a detailed description thereof will be omitted.

The various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. Each of the software modules may perform one or more of the functions and operations described herein.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above based on being executed by the processor of the particular device.

The non-transitory computer-readable medium does not refer to a medium that stores data for a short period of time, such as a register, cache, memory, etc., but semi-permanently stores data and is available of reading by the device. For example, the non-transitory computer-readable medium may be CD, DVD, a hard disc, Blu-ray disc, USB, a memory card, ROM, or the like.

A machine-readable storage medium may be provided in the form of a non-transitory storage medium. Herein, the term "non-transitory" only denotes that a storage medium does not include a signal (e.g., an electromagnetic wave) but is tangible, and does not distinguish the case in which a data is semi-permanently stored in a storage medium from the case in which a data is temporarily stored in a storage medium. For example, "non-transitory storage medium" may refer to a buffer temporarily storing data.

According to embodiments, a method disclosed herein may be provided in software of a computer program product. A computer program product may be traded between a seller and a purchaser as a commodity. A computer program product may be distributed in the form of a machine readable storage medium (e.g., compact disc read only memory (CD-ROM)) or distributed online through an application store (e.g., PlayStore™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

While example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. A control method of a user terminal, the control method comprising: performing authentication in association with a user account by transmitting a user authentication request to an account management server; based on receiving a request to access an external server after the performing of the authentication in association with the user account, transmitting the request to access the external server to the account management server; based on receiving first one time password (OTP) information and second OTP information from the account management server in response to the request to access the external server, establishing a first communication channel with a relay server to access the external server using the first OTP information;

establishing a second communication channel between the relay server and the external server using the second OTP information through the first communication channel; and communicating with the external server through the first communication channel and the second communication channel.

2. The control method of claim 1, further comprising:
obtaining an authentication token by performing authentication in association with an authentication server associated with the account management server before the performing of the authentication in association with the user account,
wherein the performing of the authentication in association with the user account comprises performing authentication in association with the user account using the obtained authentication token.

3. The control method of claim 1, further comprising:
performing authentication based on authentication information of a user with respect to an authentication server associated with the account management server before the performing of the authentication in association with the user account,
wherein the performing of the authentication in association with the user account comprises performing authentication in association with the user account through the authentication server.

4. The control method of claim 1, wherein the first communication channel is established according to a secure shell (SSH) tunneling protocol.

5. A control method of an account management server, the method comprising:
- based on receiving a user authentication request from a user terminal, performing authentication in association with the user terminal; and
- based on receiving an access request to access an external server from an authenticated user terminal, generating a first one time password (OTP) and transmitting the first OTP to the authenticated user terminal and a relay server to access the external server, and generating a second OTP to transmit the second OTP to the authenticated user terminal and the external server.

6. The control method of claim 5, further comprising:
- based on a first communication channel being established between the user terminal and the external server based on the first OTP, generating a third OTP different from the first OTP and transmitting the third OTP to the external server; and
- based on a second communication channel being established between the user terminal and the relay server based on the second OTP, generating a fourth OTP different from the second OTP and transmitting the fourth OTP to the relay server.

7. The control method of claim 5, wherein the relay server is located closest to the external server among at least one relay server provided to access the external server.

8. The control method of claim 5, wherein the first OTP and the second OTP are different from each other, one-way encrypted, and stored in the relay server and the external server, respectively.

9. A user terminal comprising: a communicator; and a processor configured to:
- perform authentication in association with a user account by transmitting a user authentication request to an account management server through the communicator;
- based on receiving a request to access an external server after the performing of the authentication in association with the user account, transmit the request to access the external server to the account management server;
- based on receiving first one time password (OTP) information and second OTP information from the account management server in response to the request to access the external server, establish a first communication channel with a relay server to access the external server using the first OTP information;
- establish a second communication channel between the relay server and the external server using the second OTP information through the first communication channel; and communicate with the external server through the first communication channel and the second communication channel.

10. The user terminal of claim 9, wherein the processor is further configured to obtain an authentication token by performing authentication in association with an authentication server associated with the account management server before the performing of the authentication in association with the user account, and
- perform authentication in association with a user account using the obtained authentication token.

11. The user terminal of claim 9, wherein the processor is further configured to:
- perform authentication based on authentication information of a user with respect to an authentication server associated with the account management server before the performing of the authentication in association with the user account, and
- perform authentication in association with the user account through the authentication server.

12. An account management server comprising:
- a communicator; and
- a processor configured to:
  - based on receiving a user authentication request from a user terminal through the communicator, perform authentication in association with the user terminal, and
  - based on receiving an access request to access an external server from an authenticated user terminal, generate a first one time password (OTP) and transmit the first OTP to the authenticated user terminal and a relay server to access the external server.

13. The account management server of claim 12, wherein the processor is further configured to:
- based on a first communication channel being established between the user terminal and the external server based on the first OTP, generate a third OTP different from the first OTP and transmit the third OTP to the external server, and
- based on a second communication channel being established between the user terminal and the relay server based on the second OTP, generate a fourth OTP different from the second OTP and transmit the fourth OTP to the relay server.

14. The account management server of claim 12, wherein the relay server is located closest to the external server among at least one relay server provided to access the external server.

* * * * *